US009716913B2

(12) United States Patent
Sivasankaran

(10) Patent No.: US 9,716,913 B2
(45) Date of Patent: Jul. 25, 2017

(54) GENERATION OF A VIDEO MOSAIC DISPLAY

(71) Applicant: TEXAS INSTRUMENTS INCORPORATED, Dallas, TX (US)

(72) Inventor: Shiju Ozhuvinamolath Sivasankaran, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 411 days.

(21) Appl. No.: 14/577,786

(22) Filed: Dec. 19, 2014

(65) Prior Publication Data

US 2016/0182834 A1    Jun. 23, 2016

(51) Int. Cl.

| H04N 5/445 | (2011.01) |
|---|---|
| H04N 21/44 | (2011.01) |
| G11B 27/036 | (2006.01) |
| H04N 21/4402 | (2011.01) |
| H04N 5/45 | (2011.01) |
| H04N 21/438 | (2011.01) |
| H04N 21/482 | (2011.01) |

(52) U.S. Cl.
CPC ..... *H04N 21/44004* (2013.01); *G11B 27/036* (2013.01); *H04N 5/45* (2013.01); *H04N 21/438* (2013.01); *H04N 21/440263* (2013.01); *H04N 21/482* (2013.01)

(58) Field of Classification Search
CPC ........... H04N 21/44004; H04N 21/438; H04N 21/440263; H04N 21/482; H04N 5/45; G11B 27/036

USPC .......................................................... 348/564
See application file for complete search history.

(56) References Cited

U.S. PATENT DOCUMENTS

| 5,526,050 | A | * | 6/1996 | King | H04N 7/181 |
|---|---|---|---|---|---|
| | | | | | 348/386.1 |
| 2003/0117525 | A1 | * | 6/2003 | Kim | H04N 5/2624 |
| | | | | | 348/445 |
| 2006/0242594 | A1 | * | 10/2006 | Sugai | G06F 3/0481 |
| | | | | | 715/781 |
| 2011/0134218 | A1 | * | 6/2011 | Neuman | H04N 13/0029 |
| | | | | | 348/43 |
| 2014/0002744 | A1 | * | 1/2014 | Tsukagoshi | G06F 3/1431 |
| | | | | | 348/588 |
| 2016/0357493 | A1 | * | 12/2016 | Zerwas | G06F 3/1438 |

\* cited by examiner

*Primary Examiner* — Michael Lee
(74) *Attorney, Agent, or Firm* — Lawrence J. Bassuk; Charles A. Brill; Frank D. Cimino

(57) ABSTRACT

Systems and methods for generating a video mosaic display are disclosed. In an embodiment, an electronic system for generating a video mosaic display of a plurality of video streams includes display buffers, a processor and a display. The processor manages storage of the display buffers for storing video frame windows corresponding to the video streams by scaling resolution of input frames of a first set of video streams that have input frames available and storing the scaled input frames as corresponding video frame windows for the first set of video streams in a first display buffer, and copying, in the first display buffer from a second display buffer, video frame windows corresponding to a second set of video streams for which input frames are not available. The display is configured to display the video mosaic layout based on the video frame windows stored in the display buffers.

16 Claims, 3 Drawing Sheets

GENERATION OF A VIDEO MOSAIC DISPLAY

TECHNICAL FIELD

The present disclosure generally relates to the field of video mosaic display.

BACKGROUND

A multiple video window display or a video mosaic display including multiple video windows is used to display multiple video streams on a single display layout. The video streams may be of different resolutions and different frame rates. Typical applications of the video mosaic display include, but are not limited to, video surveillance, video conferencing, set-top boxes, news programs, and mobile phone applications. In an example, a frame rate of a video mosaic display is equal to or higher than a highest frame rate among the video streams. In order to generate the video mosaic layout for display, the video streams are scaled so as to match the resolutions of corresponding windows in display of the video mosaic layout. In some example scenarios, a technique of scaling of each of the video streams is used for generating the video mosaic layout and involves scaling of each of these video streams a number of times equal to the frame rate of display of the video mosaic layout and irrespective of frame rates of individual video streams. Further, in this technique, a copy of a latest input frame from each video stream is stored. Hence, the technique of scaling increases requirements of scalar processing power and memory bandwidth.

Another technique of video mosaic display is performing offline scaling of the video streams and making a scaled frame copy of each video stream in an intermediate video buffer. The content of the intermediate buffer is copied to the display buffer for generating the video mosaic layout. Such technique includes scaling each video stream at a rate that matches the frame rate of the individual video stream and copying each video stream a number of times equal to the frame rate of display of the video mosaic layout. Even though the scalar processing power is decreased, additional copying increases the memory requirement and memory bandwidth in this technique.

SUMMARY

This summary is provided to introduce a selection of concepts in a simplified form that are further described below in the detailed description. This summary is not intended to identify key or essential features of the claimed subject matter, nor is it intended to be used as an aid in determining the scope of the claimed subject matter.

Various systems and methods for generating a video mosaic layout for display are disclosed. An electronic system for generating a video mosaic display of a plurality of video streams. The electronic system includes a plurality of display buffers, a processor and a display. The processor is coupled to the plurality of display buffers and is manage storage of the plurality of display buffers for storing a plurality of video frame windows corresponding to the plurality of video streams. The processor is configured to manage storage of the plurality of display buffers by scaling resolution of input frames of a first set of video streams of the plurality of video streams that have input frames available and storing the scaled input frames as corresponding video frame windows for the first set of video streams in a first display buffer of the plurality of display buffers. The processor is further configured to manage storage of the plurality of display buffers by copying video frame windows corresponding to a second set of video streams for which input frames are not available. The video frame windows are copied in the first display buffer from a second display buffer of the plurality of display buffers if the video frame windows corresponding to the second set of video streams are different in the first display buffer and in the second display buffer. Additionally, the display is coupled to the plurality of display buffers and the processor, and is configured to display the video mosaic layout based on the plurality of video frame windows stored in the plurality of display buffers.

In another embodiment, a video mosaic display method of generating a video mosaic layout is disclosed. The video mosaic display method includes receiving a plurality of video streams. Each video stream of the plurality of video streams is associated with a corresponding resolution and a corresponding frame rate. The video mosaic display method further includes managing storage of a plurality of display buffers for storing a plurality of video frame windows in each of the plurality of display buffers. Each video frame window of the plurality of video frame windows corresponds to a video stream of the plurality of video streams. Managing storage of the plurality of display buffers at an $N^{th}$ time instance includes scaling resolution of input frames of a first set of video streams and storing the scaled input frames as corresponding video frame windows for the first set of video streams in a first display buffer of the plurality of display buffers. The first set of video streams is video streams of the plurality of video streams for which the input frames are available at the $N^{th}$ time instance. Managing storage of the display buffer at the $N^{th}$ time instance also includes copying video frame windows corresponding to a second set of video streams that are stored in a second display buffer of the plurality of display buffers at an $N-1^{th}$ time instance if corresponding video frame windows for the second set of video streams in the first display buffer and in the second display buffer are different. The copied video frame windows are stored as corresponding video frame windows for the second set of video streams in the first display buffer. The second set of video streams includes video streams other than the first set of video streams in the plurality of video streams for which input frames are not available at the $N^{th}$ time instance. Additionally, the video mosaic display method includes generating a video mosaic layout for display based on the plurality of video frame windows stored in the plurality of display buffers.

Other aspects and example embodiments are provided in the drawings and the detailed description that follows.

The drawings referred to in this description are not to be understood as being drawn to scale except if specifically noted, and such drawings are only for example in nature.

DETAILED DESCRIPTION

In the following detailed description, numerous specific details are set forth in order to provide a thorough understanding of the present disclosure. However, the present disclosure may be practiced without these specific details. In other instances, well-known methods, procedures, components, and circuits have not been described in detail so as to not unnecessarily obscure aspects of the example embodiments presented herein. Moreover, it is noted that structures and devices are shown in block diagram form in order to avoid obscuring the disclosure.

Reference in this specification to "one example embodiment" or "an example embodiment" means that a particular feature, structure, or characteristic described in connection with the embodiment is included in at least one example embodiment of the disclosure. The appearance of the phrase "in one example embodiment" in various places in the specification are not necessarily all referring to the same example embodiment, nor are separate or alternative example embodiments mutually exclusive of other example embodiments. Moreover, various features are described which may be exhibited by some example embodiments and not by others. Similarly, various parameters are described that may be parameters for some example embodiments but not for other example embodiments.

Various example embodiments of the present disclosure provide generating a video mosaic layout for enabling reduction of scalar processing power and memory bandwidth. Various example embodiments of the present disclosure are presented herein with reference to FIGS. 1 to 4.

Figure 1:
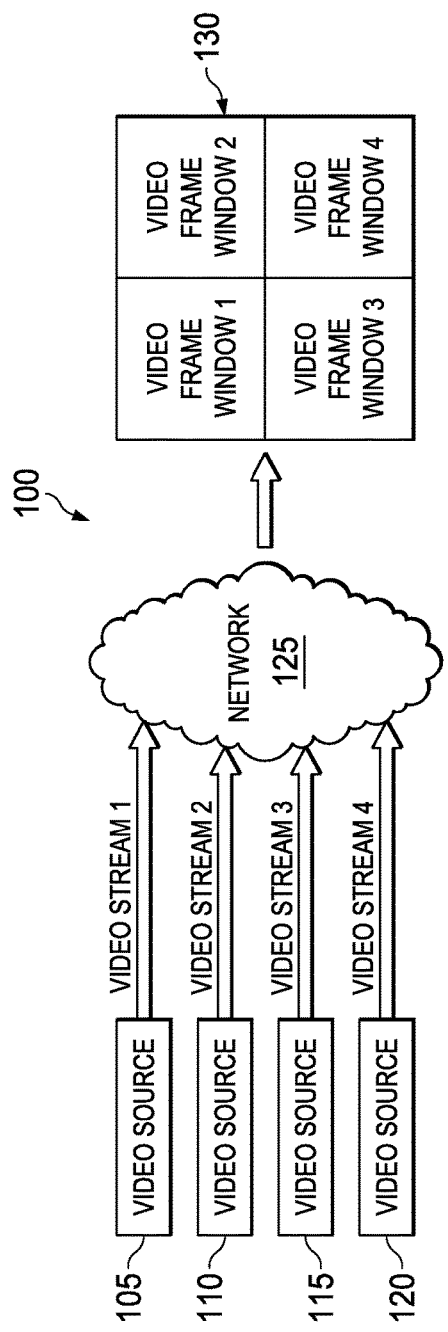
FIG. 1 is a block diagram of an example environment, in which various example embodiments of the present disclosure can be implemented.

FIG. 1 is a block diagram of an example environment 100 of a video mosaic display, in which various example embodiments of the present disclosure can be implemented. In this broad level representation of FIG. 1, the environment 100 includes a plurality of video sources, for example video sources 105, 110, 115, and 120. Examples of the video sources include, but are not limited to, a memory location storing the video, a camcorder, a digital camera, devices equipped with camera, for example, a cellular phone, a personal digital assistant (PDA), a tablet personal computer (PC), a notebook PC, and like, and a webcam. The video sources 105-120 are coupled to a device (including a display 130) through a network 125. Examples of the network 125 include, but are not limited to, computer networks including Internet, local area networks, wide area networks, and the like; short range wireless communication networks including Bluetooth® networks, Zigbee® networks, Institute of Electric and Electronic Engineers (IEEE) 802.11x networks, and the like; wireline telecommunication networks including public switched telephone network (PSTN). Examples of the display 130 include, but are not limited to, a light emitting diode display, a thin-film transistor (TFT) display, a liquid crystal display, an active-matrix organic light-emitting diode (AMOLED) display, and the like.

Each of the video sources 105-120 is capable of providing video streams. The video streams can be associated with video files that can be sent via the network 125 in small data packets or frames. As shown in FIG. 1, the video source 105 provides a video stream 1, the video source 110 provides a video stream 2, the video source 115 provides a video stream 3, and the video source 120 provides a video stream 4. The display 130 is configured to present a video mosaic layout for display of a plurality of video streams. For instance, the display 130 is configured to display content of the video streams 1, 2, 3 and 4. In one form, a video display layout may be defined so that content of the video streams 1, 2, 3 and 4 can be shown simultaneously in form of the video mosaic display. In an example embodiment, the video display layout for the video mosaic display defines relative placement of video frame windows of the plurality of video streams so as to be shown in the video mosaic layout on the display 130. For instance, as shown in the example representation of FIG. 1, a video frame window 1 corresponds to the video stream 1, a video frame window 2 corresponds to the video stream 2, a video frame window 3 corresponds to the video stream 3, and a video frame window 4 corresponds to the video stream 4.

Each video stream of the video streams 1 to 4 may have same or different resolution and frame rate. Herein, 'resolution' refers to total number of pixels in a frame of a video stream, and 'frame rate' refers to number of frames or still images that are available in one second of video and is also referred to as 'frames per second (FPS)'. For example, the video stream 1 (V1) has a resolution R1 and is received at frame rate F1, the video stream 2 (V2) has a resolution R2 and is received at frame rate F2, the video stream 3 (V3) has a resolution R3 and is received at frame rate F3, and the video stream 4 (V4) has a resolution R4 and is received at frame rate F4. In an example embodiment, a frame rate of display the video mosaic layout is the highest frame rate among the video streams that are part of the video mosaic layout so that any frames of the video streams are not missed in the video mosaic layout. For instance, if frame rate F3 is greater than other frame rates F1, F2 and F4, the frame rate F3 is assigned as the frame rate of display of the video mosaic layout.

A display resolution of the video mosaic layout may be a pre-defined display resolution and the input frames of the video streams (V1 to V4) are selectively scaled to generate corresponding video frame windows to be displayed in the video mosaic layout. Various example embodiments of generating the video mosaic layout are further described with reference to FIGS. 2 to 4.

Figure 2:
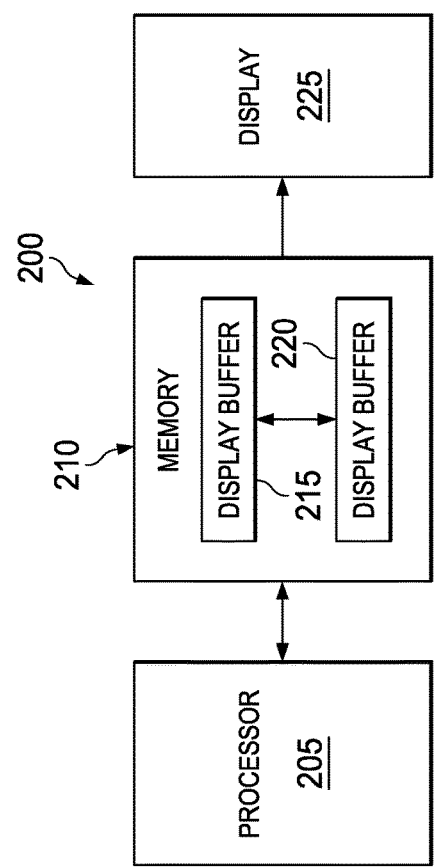
FIG. 2 is a block diagram of an electronic system, in accordance with an example embodiment.

FIG. 2 is a block diagram of an electronic system 200, in accordance with an example embodiment. The electronic system 200 includes a processor 205. Examples of the processor 205 include, but are not limited to a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip like a microprocessor, a digital signal processor, a central processing unit or an application specific instruction set processor. The processor 205 may be embodied as a single core processor, a multi-core processor, or combination of multi-core processors and single core processors. The electronic system 200 further includes a memory 210. Examples of the memory 210 include, but are not limited to, volatile memories such as random access memory, dynamic random access memory, static random access memory, and the like, and non-volatile memories such as hard disks, magnetic tapes, optical disks, programmable read only memory, erasable programmable read only memory, electrically erasable programmable read only memory, flash memory, and the like. The memory 210 may be configured to store information, data, applications, instructions or the like for enabling the electronic system 200 to carry out various functions in accordance with various example embodiments. For example, the memory 210 may be configured to include a plurality of display buffers, for example a display buffer 215 and a display buffer 220, to alternatively store a plurality of video frame windows for processing by the processor 205. Additionally or alternatively, the memory 210 may be configured to store instructions for execution by the processor 205. Herein, an example of two display buffers is used for the purposes of explanation of a video mosaic layout creation procedure, however, it should be understood that the number of display buffers is not necessarily limited to 2, and more number of display buffers can be utilized for generating the video mosaic layout.

The electronic system 200 includes a display 225, where the display 225 is coupled to the processor 205 and the display buffers 210, 220 of the memory 210. The display 225 is configured to display the video mosaic layout corresponding to the video mosaic display. In an example embodiment, the video mosaic layout is generated based on content of the plurality of video frame windows stored in the display buffer 215 and the display buffer 220. The electronic system 200 may also include output interfaces other than the display 225. Examples of the display 225 include, but are not limited to, a display such as light emitting diode display, thin-film transistor (TFT) display, liquid crystal displays, active-matrix organic light-emitting diode (AMOLED) display, and the like.

In an example embodiment, the processor 205 facilitates receipt of a plurality of video streams from a plurality of video sources (for example, video sources 105-120). The processor 205, along with other components (for example, network means) and memory 210, is configured to facilitate reception of the plurality of video streams. Each of the plurality of video streams (for example, V1, V2, V3 and V4) may have different frame rates, for example, F1, F2, F3 and F4, respectively, and different resolutions, for example, R1, R2, R3 and R4, respectively. The processor 205, along with the content of the memory 210 including the display buffers 215, 220, is configured to facilitate the display 225 to provide the video mosaic layout with a frame rate 'F' that is equal to the highest frame rate from among the F1, F2, F3 and F4. In an alternate example embodiment, the frame rate F may even be greater than the highest frame rate from among the F1, F2, F3 and F4.

In an example embodiment, at any time instance (for example, refresh cycle) of the video mosaic display, the processor 205 is configured to selectively scale one or more input frames from the video streams (V1 to V4) to generate corresponding video frame windows for the display buffer 220 or the display buffer 215, and selectively copy one or more video frame windows already stored in the display buffer 215 or the display buffer 220, respectively, for generating the video mosaic layout. Coping some of the video frame windows from one display buffer (for example, from the display buffer 220) to another display buffer (for example, from the display buffer 215), thereby avoiding unnecessary scaling of some input frames or eliminating the need for intermediate buffers, is a noteworthy benefit of the present disclosure. In an example embodiment, at any time instance of refresh cycle of display of the video mosaic layout, storage of new input frames in the display buffers (215 and 220) and access of the display buffers (215 and 220) for the video mosaic display is done such that a display buffer that is used for receiving the input frames and a display buffer that is accessed for the video mosaic display, are different display buffers. For instance, at a typical time instance, one of the display buffers, for example, the display buffer 215 is used for receiving the input frames of the plurality of video streams, and the other display buffer, for example the display buffer 220 is accessed for providing the video mosaic layout.

In an example embodiment, at any time instance, for example $N^{th}$ time instance (where N can be a time instance based on a refresh cycle of display of the video mosaic layout), if only two new input frames, for example, input frames of V2 and V3 are available (and there are no new input frames for V1 and V4), only input frames of the V2 and V3 are scaled and the scaled input frames are stored directly in the display buffer 220. Further, corresponding video frame windows of V1 and V4 are directly copied from the display buffer 215 that is already stored in the display buffer 215 at immediate preceding time instance, for example, at $N-1^{th}$ time instance if the video frame windows of V1 and V4 are different in the display buffers 215 and 220. If the video frame windows of V1 and V4 are same in the display buffers 215 and 220, the corresponding content in the display buffer 220 is maintained as same. Accordingly, at the $N^{th}$ time instance, the scaled input frames of V2 and V3 are stored in the display buffer 220 by replacing the previous corresponding content stored therein, for example corresponding content stored at an $N-2^{nd}$ time instance. At the $N^{th}$ time instance, the video frame windows stored in the display buffer 215 are accessed for the display of the video mosaic layout by the display 225. Further, at an $N+1^{th}$ time instance, the scaled input frames of V2 and V3 and the copied video frame windows of V1 and V4 of the display buffer 220 are displayed in corresponding video frame windows by the display 225 when the display buffer 215 receives the input frames. The video mosaic layout (also interchangeably referred to as 'video mosaic display') is hence generated alternately based on content of the video frame windows stored in one of the display buffer 215 and the display buffer 220.

In an example embodiment, at any given time instance of display of the video mosaic layout, the processor 205, along with other components is configured to determine those video streams that have new input frames available, and those video streams that do not have any new input frames at the given time instance. In a representation, at $N^{th}$ time instance, the video streams having new input frames may be termed as 'first set of video streams' and the video streams that do not have any new input frames (or other than the 'first set of video streams') may be termed as 'second set of video streams'. The processor 205, along with other components, is configured to determine the first set of video streams and the second set of video streams at each time instance of the display of the video mosaic layout. Further, the processor 205 is configured to generate the video mosaic layout such that the video frame windows in the video mosaic layout for each of the first set of video streams in one display buffer (for example, the display buffer 220 or the display buffer 215) is generated by scaling the corresponding input frame of the first set of video streams, and the video frame windows in the video mosaic layout for each of the second set of video streams is generated by copying the corresponding video frame windows from another display buffer (for example, the display buffer 215 or the display buffer 220, respectively), or retaining the video frame windows if the corresponding content of the second set of video streams are same in the display buffers 215 and 220. Some example embodiments of the generation of the video mosaic layout are described with reference to FIG. 3.

It should be appreciated that by scaling only those input frames having new input frames and copying/retaining for the remaining input frames and storing the video frame windows in limited number of display buffers 215, 220, computational complexity and memory requirement are reduced. It should be understood that the processor 205, the memory 210, the display buffer 215, the display buffer 220 and the display 225 are shown for representative purposes and can have different configurations and the system 200 can include additional components than those shown in FIG. 2.

Figure 3:
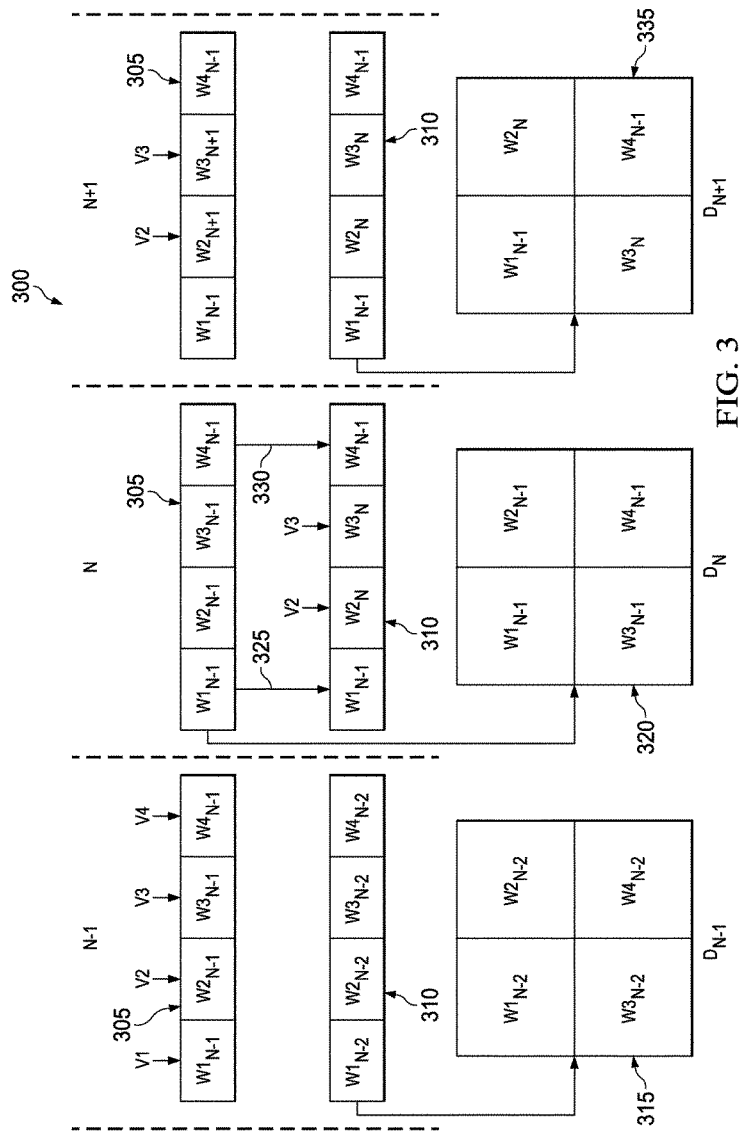
FIG. 3 is a block diagram representation of generating a video mosaic layout, in accordance with an example embodiment.

FIG. 3 is a block diagram representation 300 of generating a video mosaic layout, in accordance with an example embodiment. A reference numeral 305 illustrates a first display buffer at each of the N−1$^{th}$ time instance, the N$^{th}$ time instance and the N+1$^{th}$ time instance, and is hereinafter referred to as 'display buffer 305'. A reference numeral 310 illustrates a second display buffer at each of the N−1$^{th}$ time instance, the N$^{th}$ time instance and the N+1$^{th}$ time instance, and is hereinafter referred to as 'display buffer 310'. A reference numeral 315 illustrates a video mosaic layout $D_{N-1}$ corresponding to the display buffer 310 at the N−1$^{th}$ time instance, a reference numeral 320 illustrates a video mosaic layout $D_N$ corresponding to the display buffer 305 at the N$^{th}$ time instance, and a reference numeral 335 illustrates a video mosaic layout $D_{N+1}$ corresponding to the display buffer 310 at the N+1$^{th}$ time instance. Hereinafter, the video mosaic layout $D_{N-1}$ is also referred to as a mosaic display 315, the video mosaic layout $D_N$ is also referred to as a mosaic display 320, and the video mosaic layout $D_{N+1}$ is also referred to as a mosaic display 335.

At any time instance, one of the display buffers is used for receiving the input frames of the plurality of video streams, and the other display buffer is accessed for providing the video mosaic layout. For instance, at the N−1$^{th}$ time instance, the display buffer 305 is used for receiving the input frames and the display buffer 310 is accessed for the mosaic display 315; at the N$^{th}$ time instance, the display buffer 305 is accessed for the mosaic display 320 and the display buffer 310 is used for receiving the input frames; and at the N+1$^{th}$ time instance, the display buffer 305 is used for receiving the input frames and the display buffer 310 is accessed for the mosaic display 335.

In the example representation of FIG. 3, at the N−1$^{th}$ time instance, the display buffer 305 receives input frames of the plurality of video streams (V1-V4). For instance, the input frames are available for each of the video streams V1-V4, and hence 'a first set of video streams' includes each of the video streams V1-V4. At the N−1$^{th}$ time instance, the input frames of the video streams V1-V4 are scaled and the scaled input frames are stored as four video frame windows, for example $W1_{N-1}$, $W2_{N-1}$, $W3_{N-1}$, and $W4_{N-1}$ in the display buffer 305. It is to be understood that the scaling is performed based on the target resolution of individual display windows in the mosaic display 315. At the N−1$^{th}$ time instance, the display buffer 310 includes four video frame windows, $W1_{N-2}$, $W2_{N-2}$, $W3_{N-2}$, and $W4_{N-2}$ that are already present in the buffer 310 at N−2$^{nd}$ time instance, and the content of the display buffer 310 is not changed at the time instance N−1$^{th}$. In this example representation, at the N−1$^{th}$ time instance, the video frame windows ($W1_{N-2}$, $W2_{N-2}$, $W3_{N-2}$, and $W4_{N-2}$) of the display buffer 310 are accessed for the mosaic display 315 ($D_{N-1}$) by a display, for example the display 225.

In this example representation of FIG. 3, it is assumed that at the N$^{th}$ time instance, input frames are available only for the video streams V2 and V3 (also referred to as "the first set of video streams"), and there are no new input frames for the video streams V1 and V4 ((for example, "the second set of video streams"). In an example embodiment, the processor 205 is configured to determine the first set of video streams for example, the video streams V2 and V3 for which the input frames are available at the N$^{th}$ time instance; and is configured to determine the second set of video streams for example, the video streams V1 and V4 for which the input frames are not available at the N$^{th}$ time instance. Herein the expression "input frames are available" represents that at the N$^{th}$ time instance, an input frame of a video stream is different than that of an input frame of the video stream at the N−1$^{th}$ time instance. The display buffer 310 receives input frames for the video streams V2 and V3 and the storage of the display buffer 310 is managed by the processor 205, and status of the display buffer 305 is maintained same as its previous state, for example, at the N−1$^{th}$ time instance.

At the N$^{th}$ time instance, the processor 205 is configured to manage the storage of the display buffer 310, such that the input frames of the first set of video streams V2 and V3 are scaled to generate corresponding video frame windows $W2_N$ and $W3_N$. The processor 205 further copies video frame windows of the second set of video streams V1 and V4 from corresponding video frame windows $W1_{N-1}$ and $W4_{N-1}$ stored in the display buffer 305 at the N−1$^{th}$ time instance. Hence, the video frame window $W1_{N-1}$ stored in the display buffer 305 at the N−1$^{th}$ time instance (and maintained at the N$^{th}$ time instance) is copied (e.g., see 325) into the display buffer 310 at the N$^{th}$ time instance. Similarly, the video frame window $W4_{N-1}$ stored in the display buffer 305 at the N−1$^{th}$ time instance (and maintained at the N$^{th}$ time instance) is copied (e.g., see 330) into the display buffer 310 at the N$^{th}$ time instance. The display buffer 310 thereafter includes video frame windows $W1_{N-1}$, $W2_N$, $W3_N$, and $W4_{N-1}$ at the N$^{th}$ time instance. Further, the video frame windows $W1_{N-1}$, $W2_{N-1}$, $W3_{N-1}$, and $W4_{N-1}$ of the display buffer 305 are simultaneously displayed at the N$^{th}$ time instance as the mosaic display 320 ($D_N$) by the display 225.

As illustrated in FIG. 3, at the N+1$^{th}$ time instance, it is assumed that the input frames are available for only video streams V2 and V3 (for example, "the first set of video streams"), and there are no new input frames for the video streams V1 and V4 (for example, the "second set of video streams"). In an example embodiment, the processor 205 is configured to determine the first set of video streams for example, the video streams (such as V2 and V3) for which the input frames are available at the N+1$^{th}$ time instance; and is configured to determine the second set of video streams for example, the video streams (such as V1 and V4) for which the input frames are not available at the N+1$^{th}$ time instance. At the N+1$^{th}$ time instance, the display buffer 305 receives input frames for the video streams V2 and V3 and the storage of the display buffer 305 is updated by the processor 205; and the display buffer 310 is accessed for the mosaic display 335 (Dn+1), and the status of the display buffer 310 is maintained as its previous state as at the N$^{th}$ time instance.

At the N+1$^{th}$ time instance, the processor 205 is configured to manage the storage of the display buffer 305, such that the input frames of the first set of video streams V2 and V3 are scaled and the scaled frames are stored as video frame windows $W2_{N+1}$ and $W3_{N+1}$, respectively. The processor 205 further retains video frame windows of the second set of video streams V1 and V4 as $W1_{N-1}$ and $W4_{N-1}$ previously stored in the display buffer 305 at the N$^{th}$ time instance, as the corresponding video frame windows for the streams V1 and V4, for example, $W1_{N-1}$ and $W4_{N-1}$ are same in both the display buffers 305 and 310. Hence, the video frame window $W1_{N-1}$ previously stored in the display buffer 305 at the $N^{th}$ time instance is retained in the display buffer 305 at the $N+1^{th}$ time instance. Similarly, the video frame window $W4_{N-1}$ previously stored in the display buffer 305 at the $N^{th}$ time instance is retained in the display buffer 305 at the $N+1^{th}$ time instance. Accordingly, the display buffer 305 includes video frame windows $W1_{N-1}$, $W2_{N+1}$, $W3_{N+1}$, and $W4_{N-1}$ at the $N+1^{th}$ time instance. Further, the video frame windows $W1_{N-1}$, $W2_N$, $W3_N$, and $W4_{N-1}$ of the display buffer 310 are simultaneously displayed at the $N+1^{th}$ time instance as the mosaic display 335 ($D_{N+1}$) by the display 225. In such a manner, storage of input frames and video mosaic layout is continued for subsequent time instances.

It should be noted that instead of two display buffers 305 and 310, more number of such display buffers can also be used. In such implementations, at a given time instance, one display buffer is caused to receive the input frames, and one of the remaining display buffers can be accessed to provide the video mosaic layout. In one implementation, storage of the new input frames in display buffers and access of display buffers for the display of the video mosaic layout may be done in alternate, sequential or round robin manner, such that the display buffers that are used for receiving the input frames and that are accessed for the video mosaic display, are different display buffers.

It should be understood that at a particular time instance, input frames of only those video streams are scaled for storing into a display buffer (for example, the display buffers 215 or 220) of the plurality of display buffers, that are new input frames at that time instance, for example, different input frames as compared to their previous input frames. Further, video streams having no available input frames at the particular time instance, the corresponding video frame windows are copied from another display buffer, if corresponding video frame windows are different in each of the plurality of display buffers, or corresponding video frame windows are retained if the corresponding video frame windows are same in each of the plurality of display buffers. It should be noted that, apart from the plurality of display buffers (for example, 2 or 3) there are neither additional, nor intermediate buffers used in generating the video mosaic layout, and there is optimal usage of scaling, minimum memory and memory read/write bandwidth required for providing display of the video mosaic layout.

It should be appreciated that such provision results into significant saving of scalar and memory computation requirements, that is further described with reference to following table 1 with the help of an example scenario.

Pixel) with an input frame rate of 5 FPS, the video stream V2 has an input resolution of 1280×720 (720P) with input frame rate of 60 FPS, the video stream V3 has an input resolution of 1920×1080 (1080P) and an input frame rate of 60 FPS, the video stream V4 has an input resolution of 720×576 (standard resolution (SD)) and an input frame rate of 30 FPS. As the video stream V3 has a highest frame rate of 60 FPS, the frame rate of the mosaic display 320 is selected as 60 FPS. Further, the mosaic display 320 to be generated is a 2×2 or 4 window layout of display resolution 1920×1080 (1080P). In this example, each video frame window is scaled into pre-determined resolution, for example, 960×540 resolution at a particular time instance. As the frame rates of the video streams V2 and V3 are 60 FPS, equal to the frame rate of display of the mosaic display 320, scaling is performed for each input frame of the video streams V2 and V3, and frame copy or frame retain is not performed for the video streams V2 and V3. Hence, as illustrated in the Table 1, the video streams V2 and V3 have scaling frame rates at 60 FPS equal to the input frame rates and frame copy/retain rate is 0.

In this example scenario of Table 1, the processor 205 does not receive input frames from the video streams V1 and V4 at each time instance (for example, at frame rate of display of the mosaic display 320). The frame rates of the video streams V1 and V4 are 5 FPS and 30 FPS, respectively, and are not equal to the frame rate 60 FPS of the mosaic display 320. Hence, scaling is performed for only available input frames for V1 and V4 and frame copy or frame retain is performed for remaining time instances. In this example, new input frames are available for the video streams V1 at only 5 time instances in a time period of one second, and for the remaining 55 time instances of the one second, there are no available input frames. For instance, the new input frames of the V1 are only available at $1/60^{th}$, $13/60^{th}$, $25/60^{th}$, $37/60^{th}$ and $49/60^{th}$ part of per second as the frame rate of the V1 is 5 frames per second. Accordingly, the input frame of the V1, received at the $1/60^{th}$ second, is scaled to 960×540 resolution, and the scaled input frame is stored in the display buffer 215 or 220. In this example, video mosaic layout at the $2/60^{th}$ second includes the scaled version of the input frame of V1 that is also stored in the display buffer 215 or 220. Further, as the new input frame of V1 is not available at $2/60^{th}$ second, the video mosaic layout at the $3/60^{th}$ second uses the old copy of the input frame of V1 for the display (for example, scaled version of the input frame of V1 at the $1/60^{th}$ second) that is already stored in the display buffer 215 or 220.

TABLE 1

| Video Stream | Input Resolution | Frame Rate | Video Window | Window Resolution | Scaling Frame Rate | Frame Copy/Retain Rate |
|---|---|---|---|---|---|---|
| V1 | 2592 × 1952 (5 Mega pixel) | 5 | $W1_{N-1}$ | 960 × 540 | 5 | 55 |
| V2 | 1280 × 720 (720P) | 60 | $W2_N$ | 960 × 540 | 60 | 0 |
| V3 | 1920 × 1080 (1080P) | 60 | $W3_N$ | 960 × 540 | 60 | 0 |
| V4 | 720 × 576 (SD) | 30 | $W4_{N-1}$ | 960 × 540 | 30 | 30 |

In an example scenario of Table 1, the processor 205 receives four video streams V1, V2, V3, and V4. The video stream V1 has an input resolution of 2592×1952 (5 Mega In an example embodiment, if the new frame of V1 is scaled and stored in the display buffer 215 at $1/60^{th}$ second, the same scaled copy (video frame window) of the V1 is also copied in the display buffer 220 at 2/60$^{th}$ second. Further, at 3/60$^{th}$ second, the scaled copies of the V1 are retained in the display buffers 215 and 220, and are used for the video mosaic layout. Accordingly, from the 3/60$^{th}$ second to 12/60$^{th}$ second, the video frame window of the V1 (that is stored at the 1/60$^{th}$ second) is retained in the display buffers 215 and 220, and each buffer is accessed sequentially for the display of the video mosaic layout. Further, at the 13/60$^{th}$ second, when a new input frame of the V1 (that is different from the input frame received at 1/60$^{th}$ second) is received, the input frame is scaled to 960×540 resolution, and is stored in one of the display buffers 215 or 220 depending upon an access sequence of display buffers 215, 220. Further, the scaled input frame of V1 is copied in another display buffer at 14/60$^{th}$ second, and thereafter the scaled input frame is retained in the display buffers 215, 220 for 15/60$^{th}$ second to 24/60$^{th}$ second for the video mosaic layout. Such a sequence continues for the display of corresponding video frame window of V1 in the video mosaic layout.

Similarly, as the input frame rate of the V4 is 30 fps, the input frames of V4 are scaled 30 times in a second, and for the remaining 30 times in a second (when new input frames of V4 are not available), the video frame window corresponding to the V4 are copied/retained for the video mosaic layout. Hence, as illustrated in the Table 1, the video streams V1 and V4 have scaling frame rates at 5 FPS and 30 FPS equal to corresponding input frame rates and frame copy/retain rates are at 55 and 30, respectively.

Various example embodiments of the present disclosure offer significant savings in scalar bandwidth (bandwidth required for the processor 205 to scale down the input frames) and memory bandwidth (BW) requirements. Herein, the memory BW requirements include: 1) memory BW due to scalar read operations of the input frames, 2) memory BW due to scalar write operations of the scaled input frames into the display buffers, 3) memory BW due to read operations in copying/retaining video frame windows, and 4) memory BW due to write operations of the copied video frame windows in the display buffers. Such savings of the scalar BW (in MegaPixels/second) and the memory BW (in MegaBytes/second) are further described by comparing experimental results associated with an example embodiment of the present disclosure with some example scenarios that are not in accordance with embodiments of the present disclosure, and such comparisons are described with reference to Tables 2 to 4.

For a scenario 1, where the input frames are scaled irrespective of their input frame rates, results of the scalar and memory BW required for the video mosaic display are tabulated in Table 2. In this scenario (as provided in Table 2), the video streams V1, V2, V3 and V4 have scaling frame rates at 60 FPS (equal to the highest input frame rate of the V1-V4) and frame copy/retain rate is 0. Accordingly, in the scenario 1, resolution of input frames of all video streams are always scaled, and a total required scalar BW is determined as equal to 516.46464, a total memory BW required for scalar read is determined as equal to 1016.34048, and a total memory BW required for scalar write is determined as equal to 248.832. As the frame copy rate for all video streams is zero, no memory BW is required for frame copy read and write. In the scenario 1, no additional memory is required as there is no requirement for intermediate buffers.

TABLE 2

| Video Stream | Scaling Frame Rate | Frame Copy/Retain Rate | Scalar BW (MBps) | Memory BW- Scalar Read (MBps) | Memory BW- Scalar Write (MBps) | Memory BW- Frame Copy/Retain Read (MBps) | Memory BW- Frame Copy/Retain Write (MBps) |
|---|---|---|---|---|---|---|---|
| V1 | 60 | 0 | 303.57504 | 607.15008 | 62.208 | 0 | 0 |
| V2 | 60 | 0 | 55.296 | 110.592 | 62.208 | 0 | 0 |
| V3 | 60 | 0 | 124.416 | 248.832 | 62.208 | 0 | 0 |
| V4 | 60 | 0 | 33.1776 | 49.7664 | 62.208 | 0 | 0 |
| Total | | | 516.46464 | 1016.34048 | 248.832 | 0 | 0 |

In a scenario 2, the input frames of the video streams are scaled corresponding to their frame rate, but copied always in an intermediate buffer irrespective of their input frame rates. Results of the scalar and memory BW required for the video mosaic display for the scenario 2 are tabulated in Table 3. For example, the video streams V1, V2, V3 and V4 have scaling frame rates at 5, 60, 60, and 30 FPS, respectively as equal to corresponding input frame rates, and frame copy/retain rate for all the video streams (V1-V4) is at 60 FPS. In the scenario 2 (provided in Table 3), as video frame windows of all video streams are copied irrespective of availability of the input frames, a total required scalar BW is determined as equal to 221.59872, a total memory BW required for scalar read is determined as equal to 434.90304, and a total memory BW required for scalar write is determined as equal to 160.704. As the frame copy rate for all video streams is same at 60 FPS, the total memory BW required for frame copy read is equal to 248.832 and for frame copy write is also equal to 248.832. In the scenario 2, at least two of 1 MB intermediate buffers are required per video stream due to the frame copy rate thereby increasing additional memory requirement.

TABLE 3

| Video Stream | Scaling Frame Rate | Frame Copy/Retain Rate | Scalar BW (MBps) | Memory BW - Scalar Read (MBps) | Memory BW - Scalar Write (MBps) | Memory BW - Frame Copy Read (MBps) | Memory BW - Frame Copy Write (MBps) |
|---|---|---|---|---|---|---|---|
| V1 | 5 | 60 | 25.29792 | 50.59584 | 5.184 | 62.208 | 62.208 |
| V2 | 60 | 60 | 55.296 | 110.592 | 62.208 | 62.208 | 62.208 |
| V3 | 60 | 60 | 124.416 | 248.832 | 62.208 | 62.208 | 62.208 |
| V4 | 30 | 60 | 16.5888 | 24.8832 | 31.104 | 62.208 | 62.208 |
| Total | | | 221.59872 | 434.90304 | 160.704 | 248.832 | 248.832 |

Figure 4:
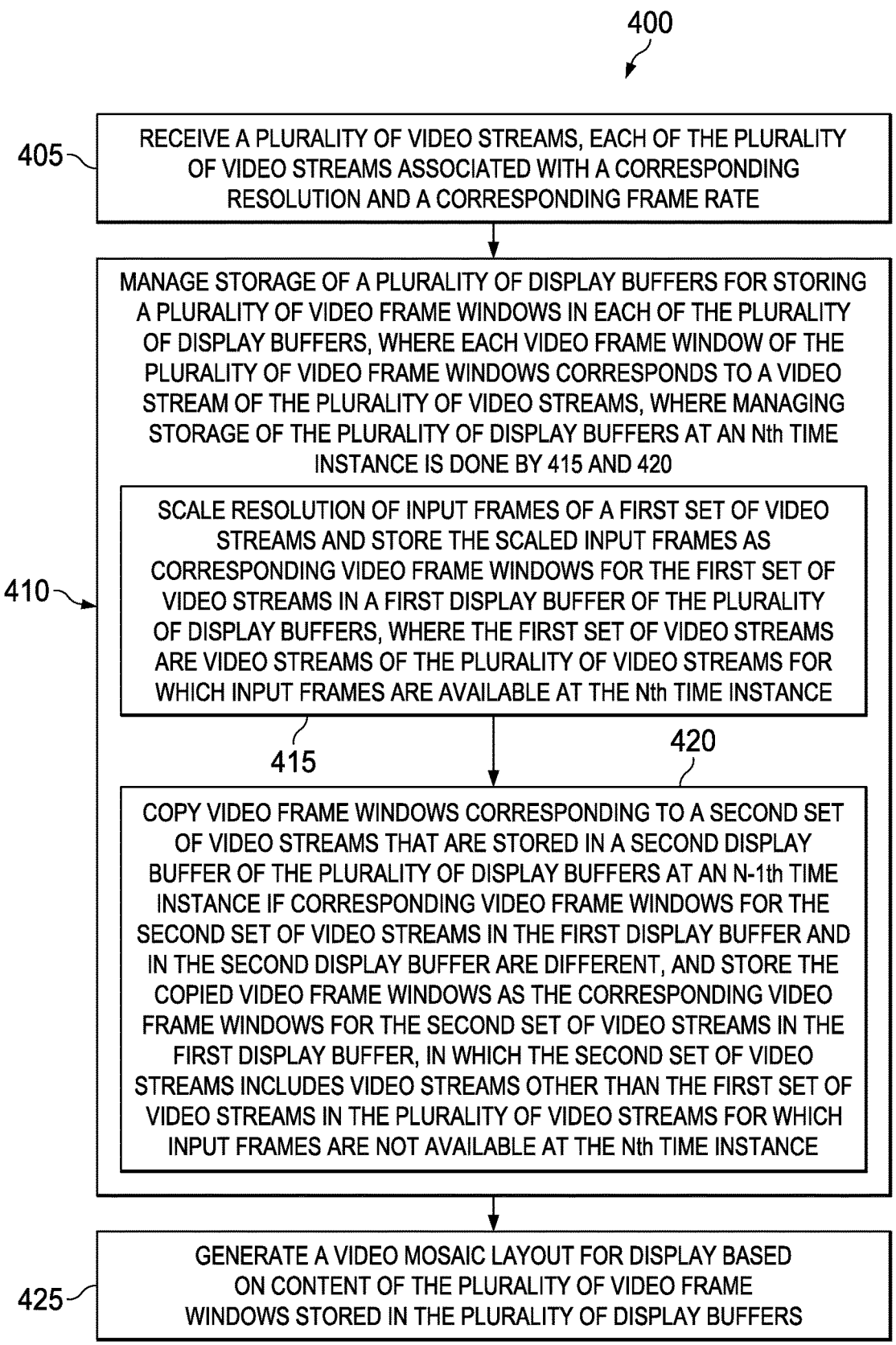
FIG. 4 illustrates a flowchart of an example video mosaic display method, in accordance with an example embodiment.

A scenario 3 is in accordance with an example embodiment of the present disclosure in which scaling frame rates of video streams are equal to corresponding input frame rates; and in cases of non-availability of the corresponding input frames, frame copies are performed amongst display buffers only when they are different, otherwise frame copies are maintained as same. Results of the scalar and memory BW required for the video mosaic display for the scenario 3 are tabulated in Table 4. For example, the video streams V1, V2, V3 and V4 have scaling frame rates at 5, 60, 60, and 30 FPS, respectively, equal to the input frame rates and frame copy/retain rate for the video streams V1, V2, V3 and V4 is at 55 FPS (60 minus 5), 0 (60 minus 60), 0 (60 minus 60) and 30 (60 minus 30). In the scenario 3 as per the present disclosure, a total required scalar BW is determined as equal to 221.59872, a total memory BW required for scalar read is determined as equal to 434.90304, and a total memory BW required for scalar write is determined as equal to 160.704 (similar to that of scenario 2 and much smaller as compared to scenario 1). Hence, as the video streams V2 and V3 are scaled, the memory BW is required for only scaling and not for frame copy. The total memory BW hence required for frame copy read is reduced to 88.128 (from 248.832 of scenario 2) and for frame copy write is also is reduced to 88.128 (from 248.832 of scenario 2). Further, in the scenario 3, no additional memory is required as there is no requirement for intermediate buffers due to frame copy from previous display buffer.

mosaic layout is explained further with reference to FIG. 4. It will be noted that for the description of the method in FIG. 4, various references will be made to the FIGS. 1-3 for explaining one or more embodiments of the method for generating the video mosaic layout.

FIG. 4 illustrates a flowchart of an example method 400 of a video mosaic display, in accordance with an example embodiment. As described in FIGS. 1 and 2, the video mosaic display includes a plurality of video frame windows that are stored in a display buffer (for example the display buffer 215 or the display buffer 220 of FIG. 2) and are displayed by a display (for example the display 225 of FIG. 2).

At 405, a plurality of video streams is received. The video streams are received by a processor, for example the processor 205 explained with reference to FIG. 2. Each of the plurality of video streams is associated with a corresponding frame rate and a corresponding resolution, as explained with reference to FIGS. 1 to 3.

At 410, storage of a plurality of display buffers (for example the display buffer 215 and the display buffer 220 of FIG. 2) is managed for storing a plurality of video frame windows in each of the plurality of display buffers. Each video frame window of the plurality of video frame windows corresponds to a video stream of the plurality of the video streams. At an $N^{th}$ time instance, the storage of the plurality of display buffers is managed by performing blocks

TABLE 4

| Video Stream | Scaling Frame Rate | Frame Copy/Retain Rate | Scalar BW (MBps) | Memory BW- Scalar Read (MBps) | Memory BW- Scalar Write (MBps) | Memory BW- Frame Copy Read (MBps) | Memory BW- Frame Copy Write (MBps) |
|---|---|---|---|---|---|---|---|
| V1 | 5 | 55 | 25.29792 | 50.59584 | 5.184 | 57.024 | 57.024 |
| V2 | 60 | 0 | 55.296 | 110.592 | 62.208 | 0 | 0 |
| V3 | 60 | 0 | 124.416 | 248.832 | 62.208 | 0 | 0 |
| V4 | 30 | 30 | 16.5888 | 24.8832 | 31.104 | 31.104 | 31.104 |
| Total | | | 221.59872 | 434.90304 | 160.704 | 88.128 | 88.128 |

It should be understood that only some examples of the video streams and the video windows are shown for representative purposes in FIG. 3, and any such number of video streams and corresponding video windows can be used for the display of the video mosaic layout.

It will be noted that FIGS. 1 to 3 are provided for representation of example embodiments only, and should not be considered as limiting to the scope of the example embodiments. An example method of generating a video 415 and 420. Various examples of managing the storage of the plurality of display buffers are explained with reference to FIGS. 2 and 3.

At 415, resolution of input frames of a first set of video streams are scaled, and the scaled input frames are stored as corresponding video frame windows for the first set of video streams in a first display buffer of the plurality of display buffers. In an example embodiment, the first set of video streams are video streams of the plurality of video streams for which input frames are available at the $N^{th}$ time instance. Various examples of the scaling of the first set of video streams are explained with reference to FIGS. 2 and 3. It is understood that the input frames that are scaled are directly written into a corresponding video frame window of the display buffer and need not be stored in any intermediate buffer.

At 420, video frame windows corresponding to a second set of video streams that are stored in a second display buffer of the plurality of display buffers at an $N-1^{th}$ time instance are copied if corresponding video frame windows for the second set of video streams in the first display buffer and in the second display buffer are different. The copied video frame windows are stored as the corresponding video frame windows for the second set of video streams in the first display buffer, in which the second set of video streams includes video streams other than the first set of video streams in the plurality of video streams for which input frames are not available at the $N^{th}$ time instance. The video frame windows are stored in the second display buffer at an $N-1^{th}$ time instance. In an example embodiment, the second set of video streams are video streams other than the first set of video streams in the plurality of video streams for which input frames are not available at the $N^{th}$ time instance. In an example embodiment, the processor determines the second set of video streams and copies or retains video frame windows from the corresponding video frame windows stored in the previous display buffer (for example, the display buffer 215 or the display buffer 220 of FIG. 2) at the $N-1^{th}$ time instance.

At 425, a video mosaic layout is generated for display based on the plurality of video frame windows stored in the plurality of display buffers. The video frame windows can be displayed from each display buffer alternatively as the video mosaic layout using the display. In an example embodiment, in case of two display buffers, one display buffer is used for storing video frame windows (by one or more of scaling, copying or retaining) and another display buffer is used for displaying the video frame windows as the video mosaic layout. The video mosaic layout is associated with a window resolution for the plurality of video windows. In some example embodiments, the video windows in the video mosaic layout can be displayed in any pattern, for example, vertically aligned, horizontally aligned, with angular alignment, relatively spaced apart to each other, and the like based on a predefined layout for the video mosaic layout.

Without in any way limiting the scope, interpretation, or application of the claims appearing below, advantages of one or more of the example embodiments disclosed herein include generating a video mosaic layout with no additional memory requirements. Various example embodiments are capable of reducing scalar processing power, memory requirement and read write memory bandwidth by implementing, at an $N^{th}$ time instance, scaling of only available input frames and copy/retaining video windows from corresponding video windows stored in a display buffer at an $N-1^{th}$ time instance, for unavailable input frames. Various example embodiments are capable of supporting a higher number of channels or video streams (channel density) and high Mega pixel resolutions. Accordingly, various example embodiments provide an efficient video mosaic layout with a video window copy method that is especially applicable to video streams of different frame rates and resolutions.

Although the present disclosure has been described with reference to specific example embodiments, it is noted that various modifications and changes can be made to these embodiments without departing from the broad spirit and scope of the present disclosure. For example, the various circuits, etc., described herein can be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods can be embodied using transistors, logic gates, and electrical circuits (for example, application specific integrated circuit (ASIC) circuitry and/or in Digital Signal Processor (DSP) circuitry).

Particularly, the functions of the processor 205 and display buffer 215 or 220 of FIG. 2 may be enabled using software and/or using transistors, logic gates, and electrical circuits (e.g., integrated circuit circuitry, such as, for example, ASIC circuitry). Embodiments of the present disclosure include one or more computer programs stored or otherwise embodied on a computer-readable medium, wherein the computer programs are configured to cause a processor to perform one or more operations, for method 400. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, devices, subsystems and methods described and illustrated in the various embodiments as discrete or separate can be combined or integrated with other systems, modules, techniques, or methods without departing from the scope of the present disclosure. Other items shown or discussed as directly coupled or communicating with each other can be coupled through some interface or device, such that the items can no longer be considered directly coupled to each other but can still be indirectly coupled and in communication, whether electrically, mechanically, or otherwise, with one another. Other examples of changes, substitutions, and alterations ascertainable by one skilled in the art, upon or subsequent to studying the example embodiments disclosed herein, can be made without departing from the spirit and scope of the present disclosure.

It should be noted that reference throughout this specification to features, advantages, or similar language does not imply that all of the features and advantages should be or are in any single embodiment. Rather, language referring to the features and advantages can be understood to mean that a specific feature, advantage, or characteristic described in connection with an embodiment can be included in at least one embodiment of the present disclosure. Thus, discussions of the features and advantages, and similar language, throughout this specification can, but do not necessarily, refer to the same embodiment.

Various embodiments of the present disclosure, as discussed above, can be practiced with steps and/or operations in a different order, and/or with hardware elements in configurations which are different than those which are disclosed. Therefore, although the disclosure has been described based upon these example embodiments, it is noted that certain modifications, variations, and alternative constructions can be apparent and well within the spirit and scope of the disclosure. Although various example embodiments of the present disclosure are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. An electronic system for generating a video mosaic display of a plurality of video streams, the electronic system comprising:
a plurality of display buffers;
a processor coupled to the plurality of display buffers, the processor configured to manage storage of the plurality of display buffers for storing a plurality of video frame windows corresponding to the plurality of video streams by:
scaling resolution of input frames of a first set of video streams of the plurality of video streams that have input frames available and storing the scaled input frames as corresponding video frame windows for the first set of video streams in a first display buffer of the plurality of display buffers; and
copying video frame windows corresponding to a second set of video streams for which input frames are not available, the video frame windows copied in the first display buffer from a second display buffer of the plurality of display buffers if the video frame windows corresponding to the second set of video streams are different in the first display buffer and in the second display buffer; and
a display coupled to the plurality of display buffers and the processor, the display configured to display the video mosaic layout based on the plurality of video frame windows stored in the plurality of display buffers.

2. The electronic system of claim 1 in which the processor is further configured to manage storage of the plurality of display buffers at an $N^{th}$ time instance by:
retaining the video frame windows corresponding to the second set of video streams stored in the second display buffer at an $N-1^{th}$ time instance if corresponding video frame windows of the second set of video streams is same in the first display buffer and in the second display buffer.

3. The electronic system of claim 1 in which the processor is configured to generate the video mosaic layout by:
displaying the video mosaic layout by accessing the plurality of video frame windows stored in the second display buffer when the scaled input frames of the first set of video streams are stored in the first display buffer; and
displaying the video mosaic layout by accessing the plurality of video frame windows stored in the first display buffer when the scaled input frames of the first set of video streams are stored in the second display buffer.

4. The electronic system of claim 1 in which the video mosaic layout is displayed at a frame rate, the frame rate being equal to or higher than a highest frame rate among frame rates of the plurality of video streams.

5. The electronic system of claim 1 in which the display is configured to display the plurality of video frame windows simultaneously.

6. The electronic system of claim 1 in which scaling the resolution of the input frames of the first set of video streams includes scaling the resolution of the input frames to a pre-determined resolution.

7. The electronic system of claim 6 in which the pre-determined resolution for an input frame of a video stream of the first set of video streams is based on a resolution of the video mosaic layout.

8. The electronic system of claim 2 in which the $N^{th}$ time instance and the $N-1^{th}$ time instance are refresh cycles of the video mosaic layout.

9. A video mosaic display method comprising:
receiving a plurality of video streams, each video stream of the plurality of video streams associated with a corresponding resolution and a corresponding frame rate;
managing storage of a plurality of display buffers for storing a plurality of video frame windows in each of the plurality of display buffers, in which each video frame window of the plurality of video frame windows corresponds to a video stream of the plurality of video streams, in which managing storage of the plurality of display buffers at an $N^{th}$ time instance includes:
scaling resolution of input frames of a first set of video streams and storing the scaled input frames as corresponding video frame windows for the first set of video streams in a first display buffer of the plurality of display buffers, in which the first set of video streams includes video streams of the plurality of video streams for which the input frames are available at the $N^{th}$ time instance; and
copying video frame windows corresponding to a second set of video streams that are stored in a second display buffer of the plurality of display buffers at an $N-1^{th}$ time instance if corresponding video frame windows for the second set of video streams in the first display buffer and in the second display buffer are different, and storing the copied video frame windows as corresponding video frame windows for the second set of video streams in the first display buffer, in which the second set of video streams includes video streams other than the first set of video streams in the plurality of video streams for which input frames are not available at the $N^{th}$ time instance; and
generating a video mosaic layout for display based on the plurality of video frame windows stored in the plurality of display buffers.

10. The method of claim 9 in which managing storage of the plurality of display buffers at the $N^{th}$ time instance includes:
retaining the video frame windows corresponding to the second set of video streams stored in the first display buffer at the $N-1^{th}$ time instance if the corresponding video frame windows for the second set of video streams is same in the first display buffer and in the second display buffer.

11. The method of claim 9 in which generating the video mosaic layout includes:
displaying the video mosaic layout by accessing the plurality of video frame windows stored in the second display buffer when the scaled input frames of the first set of video streams are stored in the first display buffer; and
displaying the video mosaic layout by accessing the plurality of video frame windows stored in the first display buffer when the scaled input frames of the first set of video streams are stored in the second display buffer.

12. The method of claim 9 in which the video mosaic layout is displayed at a frame rate, the frame rate being equal to or higher than a highest frame rate among frame rates of the plurality of video streams.

13. The method of claim 9 in which scaling the resolution of the input frames of the first set of video streams includes scaling the resolution of the input frames to a pre-determined resolution.

14. The method of claim 13 in which the pre-determined resolution for an input frame of a video stream of the first set of video streams is based on a resolution of the video mosaic layout.

15. The method of claim 9 in which generating the video mosaic layout includes displaying the plurality of video frame windows simultaneously.

16. The method of claim 9 in which the $N^{th}$ time instance and the $N-1^{th}$ time instance are refresh cycles of display of the video mosaic layout.

* * * * *